April 13, 1926.
W. I. WOOLDRIDGE
GEAR AND WHEEL PULLER
Filed Sept. 20, 1923
1,580,982
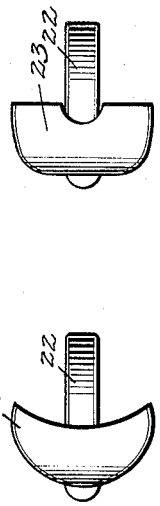
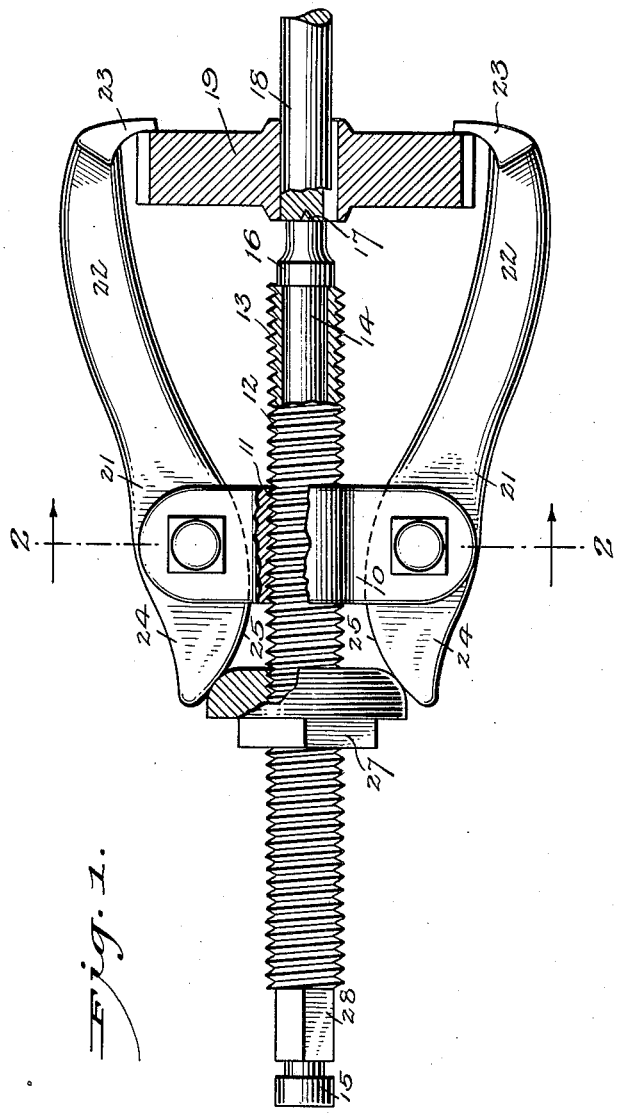
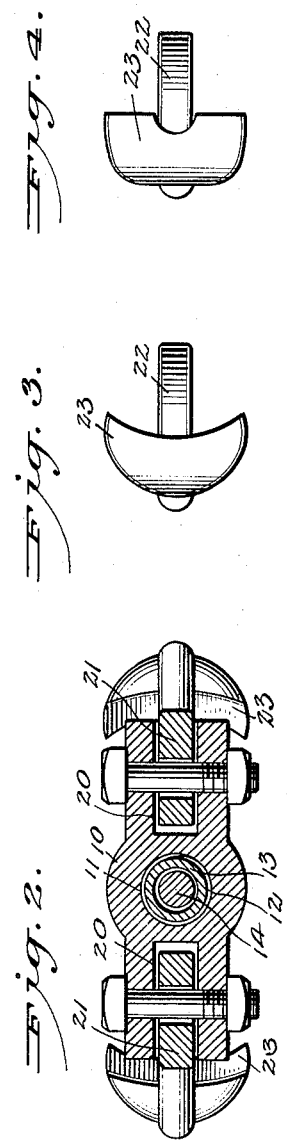
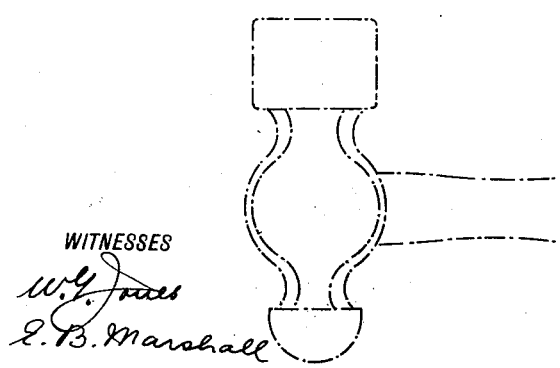
WITNESSES
INVENTOR
William I. Wooldridge
BY
ATTORNEYS Patented Apr. 13, 1926.

1,580,982

UNITED STATES PATENT OFFICE.

WILLIAM IRVING WOOLDRIDGE, OF NEW YORK, N. Y.

GEAR AND WHEEL PULLER.

Application filed September 20, 1923. Serial No. 663,842.

*To all whom it may concern:*

Be it known that I, WILLIAM I. WOOLDRIDGE, a citizen of the United States, and a resident of the city of New York, borough of Manhattan, in the county and State of New York, have invented a new and Improved Gear and Wheel Puller, of which the following is a full, clear, and exact description.

My invention has for its object to provide a gear and wheel puller constructed to remove a gear or wheel by screw means from a shaft on which the gear or wheel is mounted, after the gear or wheel has been loosened by striking a member of the gear or wheel puller in contact with an end of the shaft, the said member having a limited movement relative to the screw means to prevent injury to the said screw means when the said member is struck.

Additional objects of the invention will appear in the following specification, in which the preferred form of my invention is described.

In the drawings similar reference characters refer to similar parts in all the views, in which—

Figure 1 is a side elevation, partially in section, showing how a gear or wheel puller is operated;

Figure 2 is a sectional view on the line 2—2 of Figure 1; and

Figures 3 and 4 are views illustrating different types of gripping members.

By referring to the drawings it will be seen that the invention is constructed with a yoke 10, having a threaded opening 11, in which meshes the outer thread 12 on a sleeve 13. Disposed in this sleeve 13 there is a spindle 14 which has a limited longitudinal movement relatively to the sleeve. At the ends of this spindle 14 beyond the sleeve 13 there are heads 15 and 16, which limit the movement of the spindle relatively to the sleeve 13. The head 16 may be in the shape of a cone and it is preferably provided with a point 17 for engaging the center of a shaft 18, on which a gear or wheel 19 is mounted. Pivoted in openings 20 in the yoke 10 there are levers 21, one set of arms 22 of these levers having gripping ends 23 which are adapted to grip the gear or wheel 19 as illustrated in Figure 1 of the drawings. The other arms 24 of the levers 21 have cam surfaces 25 which are engaged by a cam 26 on a nut 27 which meshes with the outer thread 12 on the sleeve 13. The outer end 28 of the sleeve 13 is shaped in the form of a nut so that it may be turned by a wrench.

In using the gear and wheel puller the nut 27 is turned to permit of the movement of the arms 21 so that the gripping ends may be positioned to embrace the gear or wheel 19. When this has been done the nut 27 is turned home and its cam surface 26 will engage the cam surfaces on the levers 21 to press the arms 24 of the levers 21 outwardly, which will move the arms 22 inwardly so that the gear or wheel 19 will be embraced by the gripping ends 23 as has been stated. When the gripping ends 23 of the levers 21 have a firm hold on the gear or wheel 19, and the point 17 of the heads 16 of the spindle 14 engages the end of the shaft 18 with the sleeve 13 in the position indicated in Figure 1 of the drawings, the outer head 15 of the spindle 14 is hit with a hammer to loosen the gear or wheel 19 from the shaft 18.

It will be understood that inasmuch as the spindle 14 is free to move longitudinally of the sleeve 13 for a limited distance, that the striking of the head 15 of the spindle 14 and the consequent movement of the spindle 14 will not act on the outer thread 12 of the spindle 13 or on the threaded opening 11 of the yoke 10 to injure these threads. When the gear or wheel 19 has been loosened from the shaft 18, said gear or wheel 19 may be removed by the application of a wrench to the surfaces 28 of the sleeve 13, it being understood that the rotary movement of the said sleeve 13 will cause the yoke 10 to move rearwardly inasmuch as the sleeve 13 engages the head 16, which, in turn, engages the end of the shaft 18, which is fixed. This rearward movement of the yoke 10 will carry with it the levers 21 with the gripping ends 23, which will remove the gear or wheel 19 in a manner readily understood. When desired the nut 27 may be removed from the position on the sleeve 13 shown in Figure 1 of the drawings and be employed on the sleeve 13 adjacent the head 16 for engaging the arms 22 or other arms to press the arms outwardly.

I claim:

1. In a gear and wheel puller, a yoke having an opening, a sleeve with an outer thread in the opening, means mounted on the yoke for engaging a gear wheel, a nut meshing with the threaded sleeve and having means for operating the first-mentioned means, and a spindle disposed in the sleeve and free therefrom for moving longitudinally thereof when struck by a hammer the spindle being adapted to engage a shaft on which the gear wheel is mounted.

2. In a gear and wheel puller, a yoke having a threaded opening, a sleeve having an outer thread meshing in the opening, a spindle in the sleeve and free therefrom for moving longitudinally thereof when struck by a hammer the spindle being adapted to engage an end of a shaft, a lever pivoted to the yoke having means for gripping a gear wheel, and a nut meshing with the threaded sleeve and having cam means for engaging the lever to operate the latter.

3. In a gear and wheel puller, a yoke having a threaded opening, a sleeve having an outer thread meshing in the opening, a spindle in the sleeve and free therefrom for moving longitudinally thereof when struck by a hammer the spindle being adapted to engage an end of a shaft, heads on the spindle beyond the sleeve for limiting the movement of the spindle relatively to the sleeve, levers pivoted to the yoke having means for gripping a gear wheel, and a nut meshing with the threaded sleeve and having cam means for engaging the levers to operate the latter.

WILLIAM IRVING WOOLDRIDGE.